United States Patent [19]
Birk et al.

[11] Patent Number: 5,315,976
[45] Date of Patent: * May 31, 1994

[54] ERROR-CORRECTED CLOSED-LOOP CONTROL SYSTEM

[75] Inventors: Manfred Birk, Oberriexingen; Reinhard Fenchel, Calw-Altburg; Norbert Müller, Tamm; Wolf Wessel, Oberriexingen; Hans-Christian Engelbrecht, Stuttgart, all of Fed. Rep. of Germany

[73] Assignee: Robert Bosch GmbH, Stuttgart, Fed. Rep. of Germany

[*] Notice: The portion of the term of this patent subsequent to Feb. 4, 2009 has been disclaimed.

[21] Appl. No.: 760,749

[22] Filed: Sep. 16, 1991

Related U.S. Application Data

[63] Continuation-in-part of Ser. No. 647,587, Jan. 29, 1991, Pat. No. 5,085,190.

[30] Foreign Application Priority Data

Mar. 17, 1990 [DE] Fed. Rep. of Germany ....... 4008669

[51] Int. Cl.$^5$ .......................................... F02D 31/00
[52] U.S. Cl. .................... 123/357; 123/501; 123/198 D
[58] Field of Search ............... 123/501, 351, 358, 359, 123/500, 198 D

[56] References Cited
U.S. PATENT DOCUMENTS

| | | | |
|---|---|---|---|
| 4,265,200 | 5/1981 | Wessel | 123/501 |
| 4,335,695 | 6/1982 | Phipps | 123/501 |
| 4,503,830 | 3/1985 | Nakamura | 123/501 |
| 4,589,391 | 5/1986 | Sieber | 123/357 |
| 4,598,680 | 7/1986 | Lanfer | 123/501 |
| 4,638,782 | 1/1987 | Yasuhara | 123/357 |
| 4,690,114 | 9/1987 | Weisch et al. | 123/357 |
| 4,788,960 | 12/1988 | Oshizawa | 123/357 |
| 4,793,308 | 12/1988 | Brauninger | 123/198 D |
| 4,825,373 | 4/1989 | Nakamura | 123/501 |
| 5,085,190 | 2/1992 | Birk | 123/501 |

FOREIGN PATENT DOCUMENTS
6056931 5/1981 Japan .................................. 123/501

Primary Examiner—Carl S. Miller
Attorney, Agent, or Firm—Kenyon & Kenyon

[57] ABSTRACT

A method for operating an closed-loop control system for injecting fuel into an internal combustion engine, with the control system having an error correcting capability for deviations that occur in the control signal being processed by the control system, and with the control system having a controlling element, which is embodied as a precontrol, PI-controller that are operated in parallel, and a non-volatile memory for storing deviation signals.

15 Claims, 2 Drawing Sheets

ERROR-CORRECTED CLOSED-LOOP CONTROL SYSTEM

This is a continuation-in-part of application Ser. No. 647,587 filed Jan. 29, 1991, entitled ERROR-CORRECTED AUTOMATIC CONTROL SYSTEM, U.S. Pat. No. 5,085,190.

FIELD OF THE INVENTION

The present invention relates to closed-loop control systems and methods for operating same for injecting fuel into an internal combustion engine. More particularly, the present invention relates to closed-loop control systems and methods for operating same which incorporate error correction.

BACKGROUND OF THE INVENTION

Published German Patent Application No. 32 02 614 is representative of prior art relating to closed-loop control systems with error correction that form the background for the present invention. This patent discloses a device for regulating fuel injection when starting a self-igniting internal combustion engine. The regulating device has a PI-controller (proportional/integral controller) with an upstream counter. The PI-controller is connected to a sensor that detects the crankshaft position of the internal combustion engine.

The PI-controller receives a setpoint value derived from a characteristics field. The characteristics field is derived from operating parameters of the internal combustion engine. A second characteristics field, called a control characteristics field, also is provided. The output value of the second characteristics field is added to the output value of the PI-controller. If any error is detected, the output value of the PI-controller is disabled. An error condition exists, for example, when the sensor, the counter, or other components of the regulating device does not operate properly.

SUMMARY OF THE INVENTION

The system and method of the present invention provide high control precision and substantial dynamic response in the controlled and regulated method of operations of the closed-loop control system.

The system of the present invention includes a PI-controller disposed in parallel with a precontrol. The parallel connected PI-controller and precontrol are disposed between the source of a setpoint signal and a controlled system which may be embodied as an injector pump.

The system further includes two switches. The first switch is in a feedback loop from the output of the controlled system to a summing point immediately before the input to the PI-controller. The second switch is disposed between the node that branches the setpoint signal to the PI-controller and the precontrol, and the summing point that receives the feedback signal.

According to the method of the present invention, the detection of two deviation signals determine to what extent, the error correction must be made, so that component and subassembly tolerances, for example, can be compensated for. In carrying out the method, a first deviation signal is transmitted to a summing point at the output of the precontrol. The first deviation signal represents the cumulative error. In this respect, a cumulative correction of the precontrol value is provided. A second deviation signal is transmitted to a multiplication point at the input to the controlled system. The second deviation signal represents the multiplicative error. Preferably, the deviation associated with the cumulative error is fed cumulatively and deviation associated with the multiplicative error is fed multiplicatively.

According to a first refinement of the method of the present invention, intermediate deviation values lying between the end points of a control loop are determined in accordance with the controller operations point existing at a given time.

To this end, the first deviation signal is detected more or less in the middle of the regulating range and a second deviation signal at the end point of the regulating range. The interpolation curves are determined, thereby permitting error correction at every controller operations point. That is, the determination of the first and second deviation signals in light of interpolation makes it possible to generate characteristic curves for error correction which allows intermediate deviation values to be defined so that an individual correction is assignable to any controller operations point.

According to a second refinement of the method of the present invention, the gain of the precontrol, which is designed as a proportional element, corresponds to the reverse average of controlled system gain of the controlled system. When there is an average gain, the integral portion (I-portion) of the PI-controller is precise, that is, it is a tolerance-free section, and equals "0". However, since all components to some degree are tolerance-encumbered components, the respective tolerances are compensated for by the PI-controller. In this connection, the I-portion is a measure of the tolerance.

Preferably, the PI-controller receives as an input signal the signal output from of a predetermined summing point. The signals input to this summing point are the setpoint signal (with a positive sign) that is output from the controlled system and an actual signal (with a negative sign) which is the feedback signal. If the closed-loop control system is an injection installation for an internal combustion engine, then a start-of-injection setpoint signal is used as a setpoint signal and a start-of-injection actual signal as an actual signal.

In carrying out the second refinement of the method of the present invention, one proceeds so that the precontrol receives the setpoint signal as an input si/-gnal. The output of the precontrol and the output of the PI-controller are each added with a positive sign (summing point 10, summing point 13). The outputs of the summing points are input to the controlled system which, as stated, preferably is an injection pump of the internal combustion engine. Thus, the signal input to the controlled system is corrected for error based on the calculations made by the PI-controller that are added to the signal output from the precontrol.

The actual signal is fed back by means of injection-synchronous scanning operation to the summing point (summing point 6) at the input of the PI-controller. This scanning acts as a switch. The term scanning as used herein includes sampling. Furthermore, a second scanning operation, which likewise acts as a switch, is actuated synchronous with the previously mentioned scanning operation, lies between the start-of-injection setpoint-value supply and the summing point at the input to the PI-controller. Each time when the start-of-injection setpoint signal is evaluated, synchronous scanning operations take place, through which means the system deviation at the summing point is generated. This activates the PI-controller, which makes the corresponding calculation and furnishes the calculated variable at its output for correction of the signal output from the precontrol.

In a further embodiment of the closed-loop control system of the present invention, the summing point to which the first deviation signal is supplied can be optionally combined with the summing point at the output of the PI-controller so that the output values from the precontrol and the PI-controller as well as the first deviation signal are fed as input variables to the then newly forming summing point.

The setpoint signal represents a characteristic field value, which is formed from operating parameters of the internal combustion engine. The setpoint signal is input to the precontrol. Hence, it is understood that the precontrol is a characteristics field, namely a control characteristics field, which is corrected by the first deviation signal.

BRIEF DESCRIPTION OF THE DRAWINGS

The invention shall be clarified in greater detail in the following based on the Figures. The illustrate.

DESCRIPTION OF THE INVENTION

Figure 1:
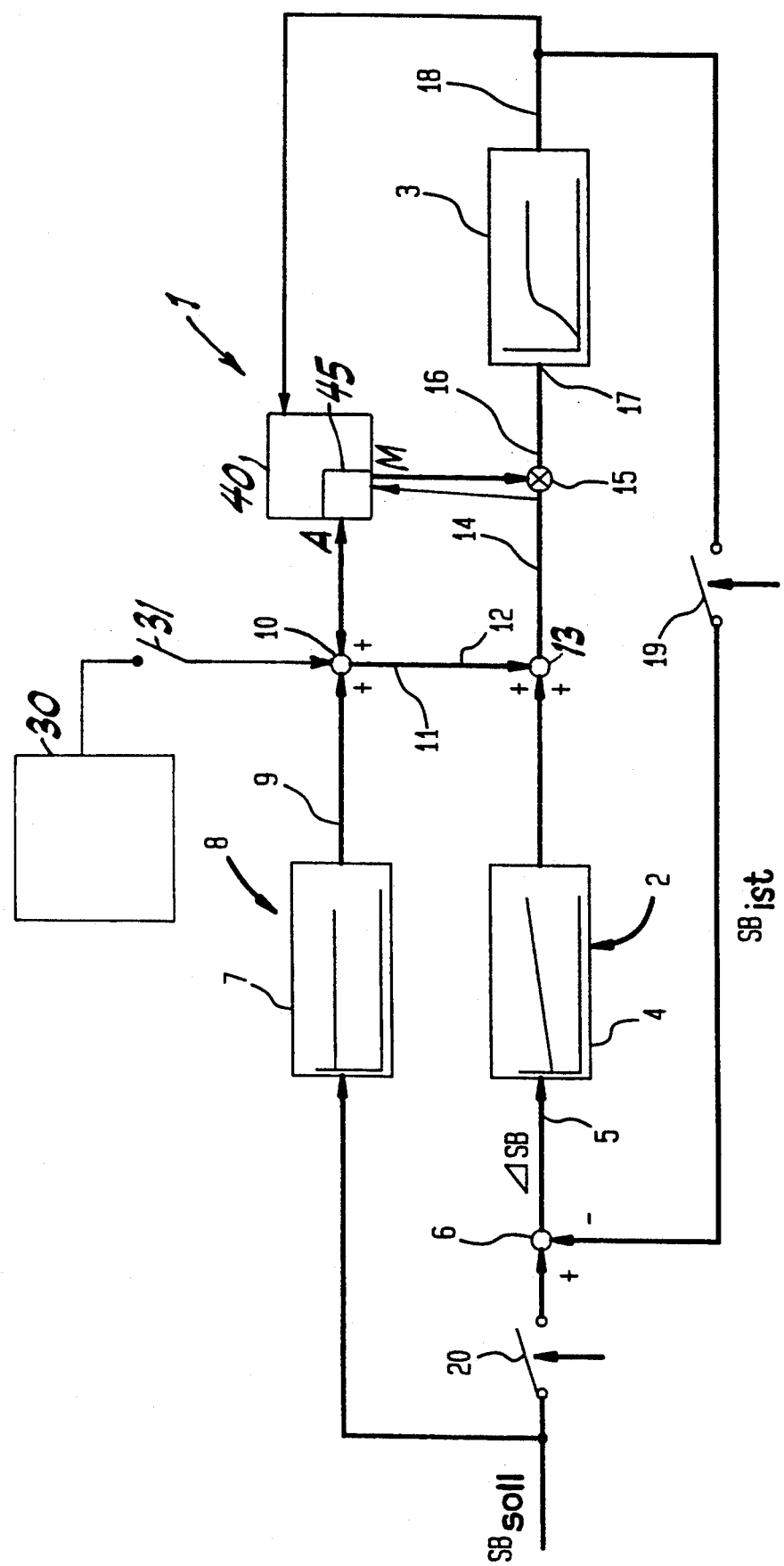
FIG. 1 a block diagram of an closed-loop control system of the present invention and FIG. 2 a characteristic curve of the controlled variable of the configuration according to FIG. 1.

The closed-loop control system 1 shown in FIG. 1 is suited for operating a configuration which injects fuel into an internal combustion engine, preferably a self-igniting internal combustion engine. In particular, the configuration can be used for regulating the start of injection. This preferably takes place—as mentioned—in self-igniting internal combustion engines, therefore, Diesel engines.

FIG. 1 depicts an closed-loop control system 1 which has a loop controller 2, controlling element 7, as well as a controlled system 3. The controlled system 3 represents the injection pump of an internal combustion engine, not shown here.

The input 5 of the loop controller 2 is connected to the output of a summing point 6. The loop controller 2 is preferably designed as a PI-controller 4. A setpoint signal $SB_{soll}$ is fed to the summing point 6 as an input variable. The setpoint signal $SB_{soll}$ is supplied from a characteristics field, not shown. The rotational frequency and the injection quantity, for example, are two representative operating parameters.

In addition, the setpoint signal $SB_{soll}$ is fed to a controlling element 7, which forms a precontrol 8 in the closed-loop control system 1 and has a proportional controller action (proportional element). The output 9 of the controlling element 7 is connected with a positive sign to a summing point 10. In addition, a first deviation signal A is fed to summing point 10. This deviation signal A shall be described in greater detail, subsequently.

Furthermore, a start controller 30 is connected via a switch 31 to the summing point 10. During the start-up operation, the switch 31 is closed and the output signal from the start controller 30 is input to the controlled system 3 via the summing point 10, as well as the summing point 13. Since the loop controller 2 and the controlling element 7 are usually not active during the start-up operation and, therefore, do not supply a signal, the output signal from the start controller 30 determines the input signal to the controlled system 3.

The output 11 of the summing point 10 is connected to an input 12 of a summing point 13. As a further input variable, the output signal of the PI-controller 4 is fed to this summing point 13. These two input values are fed with a positive sign to the summing point 13. The output 14 of the summing point 13 is an input variable to a multiplication point 15, which receives a second deviation signal M as a further input variable. This additional deviation signal M shall likewise be described in greater detail, subsequently.

A computing circuit 40 calculates the deviation signal A and the deviation signal M. These calculations are based on the actual signal $SB_{ist}$ and the signal I appearing at the output 14 of the summing point 13. The computing circuit 40 contains at least memory 45. The memory 45 is designed so that it does not lose its contents, even when the closed-loop control system or the internal-combustion engine is switched off. A non-volatile memory, such as an EEPROM, preferably is used as this memory.

The output 16 of the multiplication point 15 leads to the input 17 of the controlled system 3, and whose output 18 is an actual signal $SB_{ist}$. Consequently, a system deviation $\Delta SB$ is applied to the output of the summing point 6.

Having now described the configuration of the system of the present invention, the regulated method of the present invention will be described.

The closed-loop control system is for adjusting the start of fuel injection for an internal combustion engine, the setpoint signal $SB_{soll}$ pertains to a start-of-injection setpoint signal, and the actual signal $SB_{ist}$ pertains to a start-of-injection actual signal.

The output 18 is connected to the summing point 6 via scanning operations. Switch 19 is disposed in the feedback line. This scanning operation works synchronously with the start of injection.

The setpoint value $SB_{soll}$ is input to the summing point 6 by means of additional scanning operations. Switch 20 is disposed in the line that leads to the summing point 6 for this purpose of the scanning operation.

The two scanning operations work in synchronism. This means that each time the start-of-injection signal is evaluated to determine the corrections that are needed for application to the setpoint signal, $SB_{soll}$, scanning operations are undertaken. The scanning operations can be considered as the closing of the switches 19 and 20, so that the system deviation is available at the summing point 6, and the PI-controller can make its calculation.

In the depicted closed-loop control system for fuel injection, the controlled system 3 is comprised of an injection pump associated with the internal combustion engine. The individual pumps of one series type are subject to unavoidable tolerances. The conditions are now selected in such a way that when a specimen is not tolerance-encumbered, the gain of the precontrol 8 corresponds to the reverse average of controlled system gain of the controlled system 3. With the acceptance of a tolerance-free specimen, the I-portion or integral portion of the PI-controller 4 has a value "0" when there is an average gain. In the case of tolerance-encumbered specimen, the tolerance is compensated for by the PI-controller 4. The I-portion is a measure for the tolerance.

Figure 2:
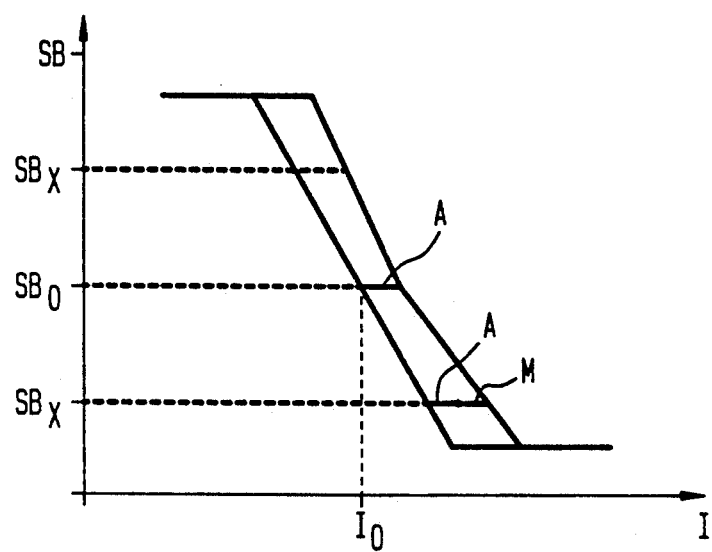

Now, we shall describe in detail error correction which compensates for the tolerances. To this end, one draws upon FIG. 2. On the ordinates of a cartesian coordinate system, FIG. 2 shows the start of injection SB in dependence upon an output signal 14 of the signal I appearing at the summing point 13. Preferably, the measured start of injection $SB_{ist}$ is thereby plotted as the start of injection.

The left characteristic curve indicates the dependence of the start of injection upon signal I for a tolerance-free system. The right characteristic curve shows the dependence for a tolerance-encumbered system. Now, if one considers a specific value for the start of injection, then a deviation results in the case of signal I between the tolerance-free and the tolerance-encumbered systems. This deviation can be split into a cumulative and a multiplicative error. To this end and according to FIG. 2, a reference point ($SB_0$, $I_0$) is to be approached. It lies more or less in the middle of the regulating range. In this manner, one is able to determine the first deviation signal A.

To ascertain the multiplicative error, a setting in the vicinity of one of the end points (for example $SB_x$) is approached, through which means a deviation results, which is composed of the first deviation signal A and second deviation signal M. Accordingly, the subtraction of the value for the first deviation A from the total deviation leaves the second deviation.

In determining the first deviation signal A and the second deviation signal M, the following boundary conditions must be adhered to:

The mechanical friction of the components and subassemblies of the injection pump should be negligibly small, thus they should lie more or less in the range of the value "0". To this end, one should strive for a minimum rotational frequency of the internal combustion engine, that is the rotational frequency n should be just slightly greater than a low limiting rotational frequency, $n_{limit}$.

The injection quantity should also exceed a minimum value; that is, the injection quantity should be just slightly greater than an injection-quantity low limiting value, $Q_{limit}$.

The average value of the system deviation should lie in the range of approximately "0", and that for a time period $\geq 10$ seconds; i.e., one should strive for a stationary state.

Under these conditions, average values are able to be determined for the first and second deviation signal A, M, in accordance with the equations.

$$\overline{A} = \sum_{i=1}^{m} A_i/m$$

$$\overline{M} = \sum_{i=1}^{m} M_i/m$$

Intermediate deviation values, in other words values that lie between the two end points of the control loop, can preferably be determined through interpolation, in particular linear interpolation, so that the deviations can be defined for the controller operations point existing at the time.

To correct these deviations, the first deviation signal A and the second deviation signal M are fed to the closed-loop control system in accordance with the controller operations point existing at the time. This is accomplished for the first deviation signal A, which represents a cumulative error, in that it is fed to the summing point 10. To compensate for the multiplicative error, the second deviation signal M is fed in multiplicatively in that this deviation signal—as already described—is fed as an input variable to the multiplication point 15.

Both before switching over from closed-loop control to open-loop control, as well as before switching off the control unit or the internal-combustion engine, the last determined deviation signals A and M are permanently stored in the memory 45. Therefore, these values are immediately available again when the closed-loop control is switched on again and for the start-up. The correction of the deviation by way of deviation signals A and M takes place in all operational stages, particularly during the starting process. As a result of this procedure, the tolerances of the control loop are already considered at the time of start-up. In this manner, the start-up performance as well as the start-up emission values are able to be improved.

One is therefore able to attain a considerable dynamic response with the measures according to the invention, both in the controlled (precontrol 8) and in the regulated (PI-controller 4) cases, whereby the errors occurring as a result of tolerance are corrected.

We claim:

1. A method for operating an closed-loop control system for injecting fuel into an internal combustion engine, with the control system being capable of correcting errors caused by deviations that occur due to operating tolerances of injection system components, and with a controlling element (7), operating as a precontrol (8), and a controller (2) being operated in parallel in the control system, the method comprising:

determining a first deviation signal value (A) substantially in a middle of a regulating range for fuel injection control;

determining a second deviation signal value (M) substantially near one of the end points of the regulating range for fuel injection control;

storing the first and second deviation signals (A, M) in a non-volatile memory; and feeding the first and second deviation signals to the control system as correction signals for a fuel injection signal being processed by the control system, with the corrections to the fuel injection signal being contemporaneous with a particular operations point of the controller (2).

2. The method according to claim 1, wherein the controller (2) is a PI-controller (4).

3. The method according to claim 1 or 2, wherein the first deviation signal value (A) represents a cumulative error and the second deviation signal value (M) represents a multiplicative error.

4. The method according to claim 3, wherein the feeding step further comprises cumulatively feeding to the closed-loop control system (1) the first deviation signal value associated with the cumulative error, and multiplicatively feeding the second deviation signal value associated with the multiplicative error.

5. The method according to claim 2, wherein the method further includes transmitting the first deviation signal value (A) to a first summing point (10) at an output (9) of the precontrol (8).

6. The method according to claim 2, wherein the method further includes transmitting the second deviation signal value (M) to a multiplication point (15) at an input of a controlled system (3) of the closed-loop control system.

7. The method according to claim 2, wherein the method further includes determining by interpolation intermediate deviation signal values for the first and second deviation signals that lay between the end points of a control loop for a particular controller operations point existing at a given time, with the intermediate deviation signal values being fed the closed-loop control system (1).

8. The method according to claim 2, wherein gain of the precontrol (8) corresponds to a reverse average of controlled system gain.

9. The method according to claim 2, wherein the method further includes inputting a signal output from a second summing point (6) to the PI-controller (4), with a setpoint signal ($SB_{soll}$) with a positive sign, and an actual signal ($SB_{ist}$) with a negative sign coming from an output (18) of a controlled system (3), being fed as inputs to the second summing point (6).

10. The method according to claim 9, wherein the setpoint signal ($SB_{soll}$) pertains to a start-of-injection setpoint signal, and the actual signal ($SB_{ist}$) pertains to a start-of-injection actual signal for injecting fuel into an internal combustion engine, preferably a self-igniting internal combustion engine.

11. The method according to claim 2, wherein the method further includes inputting a setpoint signal ($SB_{soll}$) to the precontrol (8).

12. The method according to claims 2, 9, or 11, wherein the method further includes feeding with a positive sign an output (9) of the precontrol (8) and an output of the PI-controller (4) to a third summing point (13).

13. The method according to claim 6, wherein a controlled system (3) includes an injection pump of an internal combustion engine.

14. The method according to claims 9, 10, and 11, wherein a setpoint signal ($SB_{soll}$) represents a characteristics field value formed from predetermined operating parameters of the internal combustion engine.

15. The method according to claim 7, wherein the interpolating step further includes linear interpolating.

* * * * *